Dec. 3, 1968   J. R. HOLLAND   3,414,879
ADVANCE BRAKE WARNING DEVICES FOR ROAD VEHICLES
Filed July 15, 1965   2 Sheets-Sheet 1
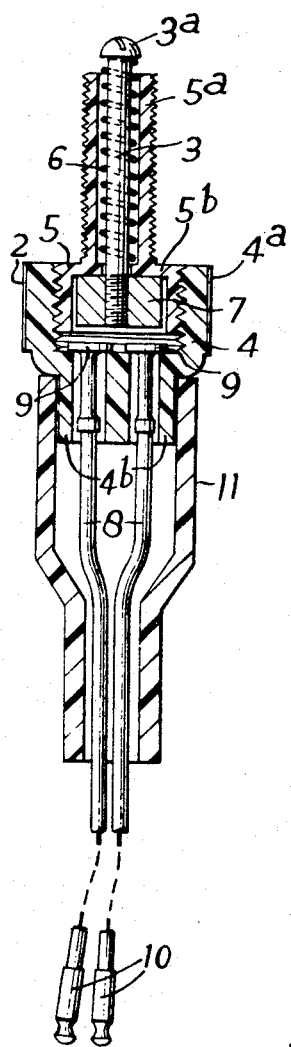
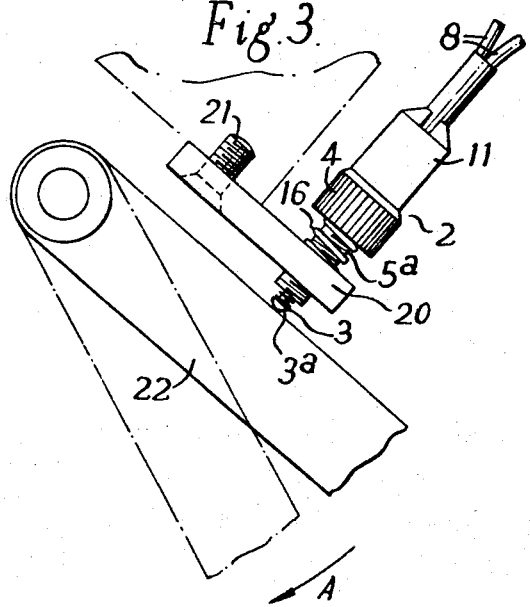
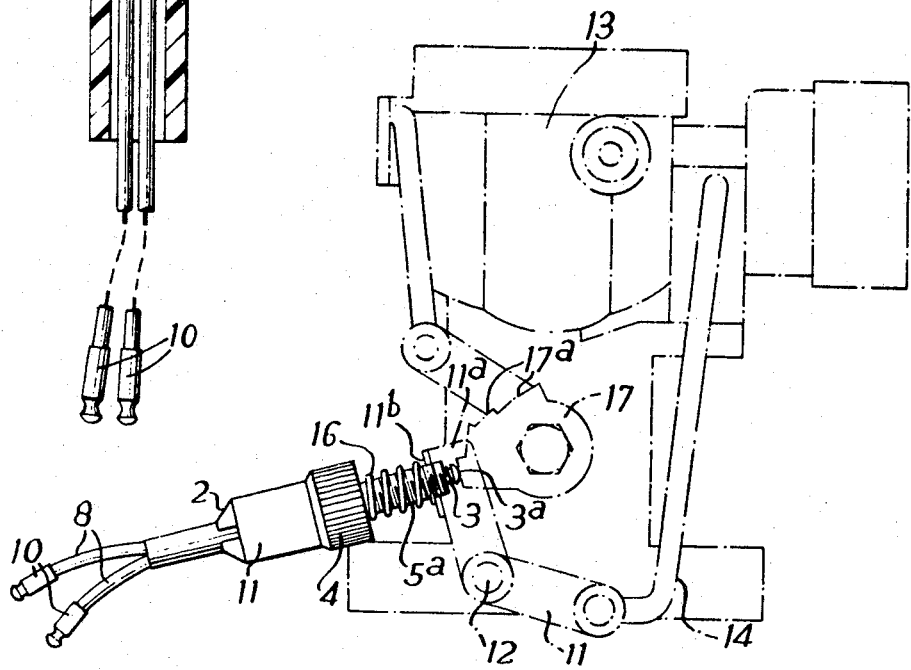

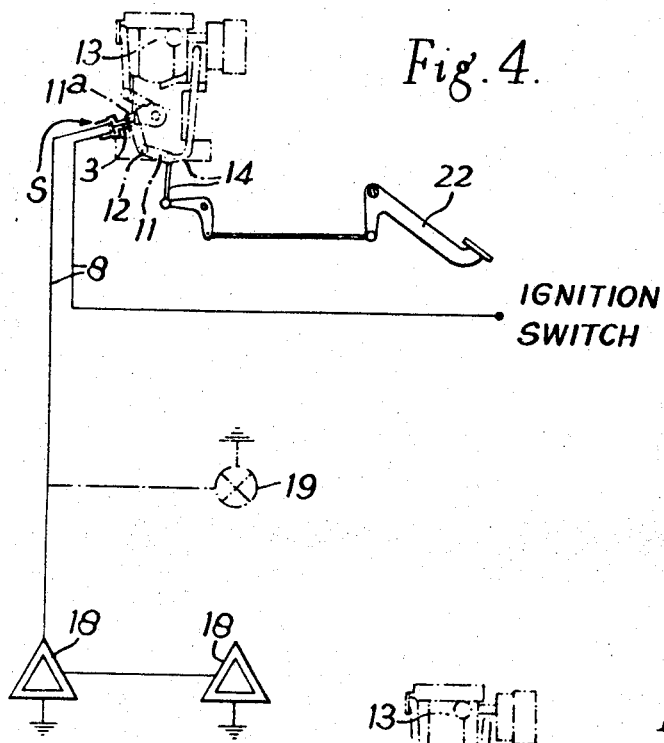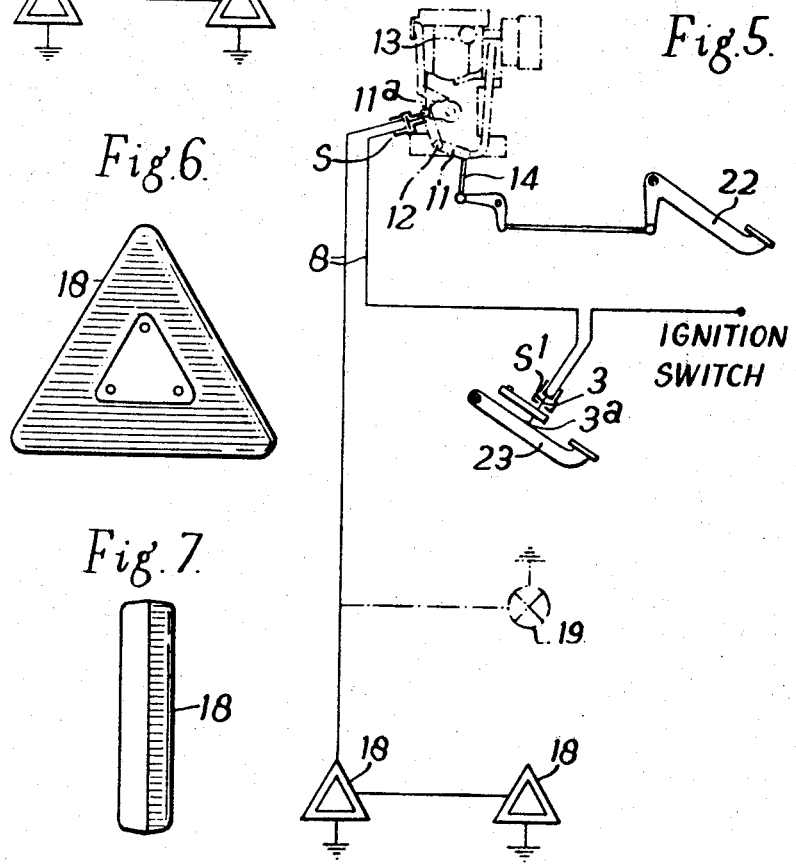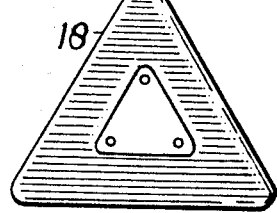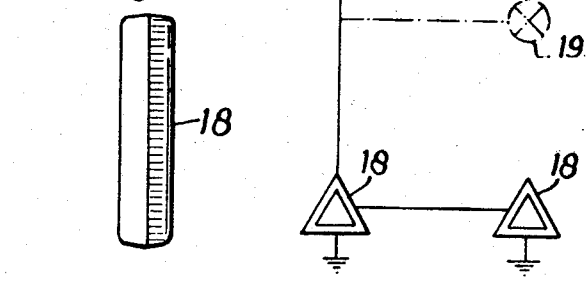

United States Patent Office 3,414,879
Patented Dec. 3, 1968

3,414,879
ADVANCE BRAKE WARNING DEVICES
FOR ROAD VEHICLES
Joseph R. Holland, North Hykeham, England, assignor to Pharmaceutical Plastics Limited, Lincoln, England, a British company
Filed July 15, 1965, Ser. No. 472,255
8 Claims. (Cl. 340—71)

ABSTRACT OF THE DISCLOSURE

A pre-brake warning system in a road vehicle powered by an internal combustion engine, which comprises an electrical circuit connected to a current source and incorporating a warning lamp and a switch device which is operable by the vehicle accelerator to cause the lamp to light up whenever the driver releases the accelerator to decelerate the vehicle. The switch device comprises a two-part tubular housing containing two electrical contacts which are connected in the circuit, and a spring biased plunger which is movable by the accelerator to bridge the contacts. The switch device can be used as a slow-running adjusting screw in place of the conventional throttle-adjusting screw. A further, similar switch device operable by the vehicle clutch, may be provided in the circuit for preventing the warning lamp being illuminated each time the clutch is operated during a gear change.

---

This invention appertains to brake warning devices for motor cars, vans, lorries, motorcycles, motor scooters and like road vehicles powered by internal combustion engines and having accelerator and brake members.

In this regard the invention is primarily applicable to vehicles powered by petrol engines, and wherein the accelerator member is constituted by a pedal and is connected, through intermediate connections of any appropriate character, with a suitably movable arm carrying an adjustable throttle adjusting or slow-running screw. This conventional arrangement is accordingly such that whenever the driver's foot is taken off the accelerator pedal, the arm moves, under spring action, until the leading end of the throttle adjusting or slow-running screw impinges upon an abutment on the carburetor with the throttle still open to the required extent to provide slow-running conditions. Thus, by adjustment of the screw and/or the abutment, the extent to which the throttle is left open upon release of the accelerator pedal can be varied to vary the slow-running rate.

It is, however, to be clearly understood that the invention may also be applied to vehicles powered by diesel (compression ignition) engines, and wherein the accelerator pedal again controls the admission of fuel into the engine cylinders.

Now it is the prevailing practice to furnish the rear ends of all road vehicles with brake warning lamps which are so wired into the electrical circuitry of the vehicle that the said lamps automatically light up whenever the driver operates the brake member to decelerate the vehicle. But in practice in a vehicle having accelerator and brake pedals the time taken in the transfer of the driver's right foot from the accelerator pedal on to the brake pedal results in a significant delay which could have serious consequences.

The object of the present invention is to provide, in a road vehicle, a pre-brake warning system capable of signalling to following vehicles, in advance, the driver's intention to decelerate rapidly, either by merely releasing the accelerator member or by releasing this member and operating the brake member.

According to this invention there is provided, in a road vehicle powered by an internal combustion engine, a biased switch device which is wired into a warning light circuit and is so associated with the accelerator member of the vehicle that when the driver operates the said member to decelerate the vehicle, the switch device will be automatically operated to close the circuit and so light up a warning lamp or lamps included therein. Conversely, whenever the driver operates the accelerator member to accelerate the vehicle, the switch will be automatically moved, against the biasing action, to switch off the warning light or lights.

For convenience in the following further description, such a biased switch device will be simply referred to as a "brake safe" switch.

Thus, the idea is that whenever the driver intends to decelerate rapidly by releasing the accelerator member and, in most cases, operating the brake member, the action of releasing the accelerator member will result in the lighting up of the signalling lamp or lamps. This takes place even before the brake member is operated if this is the case. This pre-brake warning, e.g. of anything up to a second or even more, makes for increased safety. Moreover, the warning lamp or lamps will remain on even with the vehicle stationary (providing the engine is running) and will not be extinguished until the driver next operates the accelerator member to cause the vehicle to move.

Within the broad scope of the present invention warning lights incorporated into the pre-brake warning system may, if desired, be constituted by the actual brake warning lamps conventionally fitted to the rear of the vehicle. It is, however, primarily the intention, and will in any case usually be preferable, to provide a special warning light or lights which or each of which is additional to the normal brake warning lamps. Indeed, existing or future road traffic regulations may within certain jurisdictions dictate the necessity to provide a special or separate pre-brake warning light system.

In a convenient embodiment of the invention, the brake safe switch comprises a tubular housing for a spring-loaded plunger, one end of which latter is provided with a contact element of an electrical switch the complementary element or elements of which is or are carried by the said housing, the opposite end of the plunger being arranged either to contact an abutment or to be contacted by a moving part for the purpose of causing closure of the switch, whenever the accelerator member is released, and to be disposed clear of the abutment or the moving part for the purpose of permitting opening of the switch whenever the accelerator member is operated to accelerate the vehicle. An abutment, if provided, may be located on the engine carburetor, in which instance the brake-safe switch may replace the adjustable throttle adjusting or slow-running screw conventionally carried by the aforementioned movable arm associated with that abutment. This arrangement is primarily intended to be applied to a motor car, van, lorry or like vehicle. Alternatively, the brake safe switch may be mounted on any convenient fixed part of the road vehicle and whenever the accelerator member is released, be arranged to be acted upon, either by the accelerator member itself or by any appropriate movable part of connections extending between the said member and the carburetor.

In order that the invention may be more clearly understood and readily carried into practical effect, a specific example of a brake safe switch and typical ways in which it can be incorporated into a pre-brake warning system in a motor car or like vehicle fitted with accelerator, brake and clutch pedals will now be described with reference to the accompanying drawings, wherein, FIGURE 1 is a longitudinal sectional view through a brake safe switch, FIGURE 2 illustrates the manner in which such a switch may be arranged to replace the throttle adjusting or slow-running screw on an engine carburetor, FIGURE 3 similarly shows how a brake safe switch is mounted for contact and operation by the pedal lever of either the accelerator or the clutch of a vehicle, as and for the purpose hereinafter to be described, FIGURE 4 is a simple wiring diagram of a typical pre-brake warning system, FIGURE 5 is a diagram similar to FIGURE 4 but illustrating a modification designed to prevent the pre-brake warning lights from flashing when changing gear, and FIGURES 6 and 7 are front and side views respectively of one possible form of rear warning light.

Referring to FIGURE 1 it will be seen that the particular form of brake safe switch illustrated comprises a bi-partite tubular housing 2 for a spring-loaded plunger 3. The tubular housing 2 consists, on the one hand, of a main body part 4 which is principally of a hollow cylindrical and internally screw-threaded form and, on the other hand, of a hollow, externally screw-threaded plug 5 which screws into and closes the said main body part and is provided with an integral outwardly extending tubular shank 5a. The internal screw thread formed in the main body part 4 is a relatively coarse one and is complementary to the external screw thread on the hollow plug 5. The tubular shank 5a is also externally but more finely screw-threaded to enable the brake safe switch to be screwed adjustably into a correspondingly tapped hole formed in the part which is to carry it. The plunger 3 is in the form of a screw which is screw-threaded at its inner end portion only and at its outer end is furnished with a rounded head 3a having therein a diametral screw-driver slot.

The rounded head 3a constitutes the contact point of the plunger, i.e. the point which is acted upon to depress the plunger against the action of the spring 6 controlling it. As will be clearly seen in FIGURE 1, this spring 6 which is of the helical compression type, surrounds the plain portion of the plunger 3 and is interposed between the mainly closed outer end 5b of the plug 5 and the opposed under or inner side of the rounded head 3a. Firmly screwed on to the inner end of the plunger 3 is a metal switch contact element 7 of cylindrical form. With the plunger fully retracted by its spring 6, the contact element 7 is held against the closed outer end 5a of the plug 5. This outer end, however, has formed therein a central circular hole through which the plunger 3 is free to move axially.

The external circumferential surface of the main cylindrical body part 4 may, as shown, be milled at 4a to facilitate the operation of screwing the brake safe switch into position. The end of this main body part 4 of the tubular housing remote from the plug 5 is formed with a pair of parallel hollow bosses 4b through which extend a pair of conductor wires 8. Flat metal elements 9 of the switch lying in the bottom of the hollow main part 4 and arranged to be contacted by the cylindrical contact element 7 are soldered upon the inner ends of the conductor wires 8. The outer ends of the said wires 8 are provided with terminals 10, and a protective shroud 11 of any suitable flexible insulating material is provided to fit over the hollow bosses 4b. One of these conductor wires is connected, through the ignition switch, with a source of electric current, e.g. derived from a battery.

The two parts 4 and 5 of the tubular housing 2 may be moulded in any suitable insulating plastics material. In any event, the arrangement is such that whenever the plunger head 3a is contacted and pressed inwardly, the plunger 3 will be axially displaced against the action of the spring 6 to move the element 7 into bridging contact with the two switch elements 9, thereby closing the switch and making the relevant circuit; conversely, whenever the plunger 3 is released, by the relief of pressure on its head 3a, it will be withdrawn under the action of the spring 6 to move the element 7 away from and clear of the elements 9 and so open the switch and break the circuit.

In one specific pre-brake warning system, a brake safe switch such as that just described is screwed into position on one arm 11a of a two-armed lever 11 which is fulcrumed at 12 upon the engine carburetor 13 (see FIGURE 2) and is in turn connected, through intermediate connections 14 of any suitable character, with the accelerator pedal lever 22. The tubular housing 2 of the switch replaces, and thus itself constitutes, the throttle-adjusting screw which is carried by and is adjustable in the arm 11a (slow-running arm). The externally screw-threaded tubular shank 5a of the housing 2 is, in practice, screwed into a suitably tapped hole formed in a bent lug 11b on the arm 11a, and to steady and secure the housing in any position to which it is adjusted, there is provided a comparatively strong helical locking spring 16 which surrounds the shank 5a and is interposed between the outer end face of the plug 5 and the opposed face of the lug 11b. As will be appreciated, in this particular arrangement it is the rounded head 3a of the plunger 3 which acts in the place of the leading end of the replaced conventional throttle adjusting or slow-running screw. Thus, the head 3a is arranged to make contact with an abutment 17 on the carburetor 13. If desired, although this is optional, the abutment 17 may be regularly adjustable to present to the head 3a a selected one of a plurality of faces 17a disposed at respectively different radial distances from the axis of the said abutment. The pre-brake warning system now being described includes, as shown in FIGURE 4, a pair of rear and suitably earthed warning lights 18 each of which may advantageously be amber coloured and of the triangular form depicted in FIGURES 6 and 7. The precise form and shape of these rear warning lights may, however, vary according to requirements and, if desired, the system may incorporate only one such light.

In any event, the system is such that whenever the accelerator pedal is released, preparatory to transference of the driver's foot on to the brake pedal, the turning movement of the arm 11a will bring the head 3a of the plunger 3 into contact with the abutment 17 to arrest the pedal—with the throttle still open to the required extent to provide slow-running conditions. But during establishment of fully effective contact of the head 3a with the abutment 17, the plunger 3 will first be depressed against the action of the springs 6 to move the switch element 7 into contact with the two switch elements 9, thereby closing the pre-brake warning circuit with the result that the or each rear warning light lights up. This accordingly happens before even the driver's foot reaches the brake pedal so giving an advance warning. Moreover, with the head 3a in contact with the abutment 17, the plunger 3 will be forcibly held, against the spring action, in such a position as to maintain closure of the brake safe switch; on the other hand, whenever the said switch, upon depression of the accelerator pedal, is moved together with the arm 11a in a direction away from and clear of the abutment 17, the plunger 3 will be released and move under the spring influence to open the switch and so extinguish the warning light or lights.

A wiring diagram of the system just described is shown in FIGURE 4. In this diagram the brake safe switch is conventionally represented at S. Of the two wires 8 extending from the switch S, one of them is connected to one side of the ignition switch whilst the other is connected to one of the pair of rear warning lights 18. The latter are connected in series and earthed. Optionally, this simple system may additionally incorporate an earthed indicator lamp 19 which automatically lights up and is extinguished together with the pre-brake warning light or lights 18; by arranging the said indicator lamp in front of the driver the latter is given an indication as to whether or not the warning light or lights is or are functioning properly.

As previously mentioned herein, instead of the brake safe switch being arranged to replace the conventional throttle adjusting or slow-running screw, it may be directly operated by the accelerator pedal lever itself. Such an arrangement is illustrated in FIGURE 3, wherein the tubular switch housing 2 is shown mounted in a bracket 20 which is attached by means of screws 21 to the vehicle chassis—with the head 3a of the plunger 3 opposing the upper edge of the accelerator pedal lever 22. Accordingly, whenever the accelerator pedal is released, or the pressure of the driver's foot thereon is relieved, the pedal lever 22 will rise and, in so doing, will contact the head 3a with the result that the brake safe switch will be closed. Conversely, depression of the accelerator pedal lever 22, i.e. in the direction of the arrow A, will permit of projection of the plunger 3 and consequent opening of the brake safe switch.

Now as will be appreciated the simple system so far described is such that in practice the warning light or lights will light up whenever pressure of the driver's foot on the accelerator pedal is relieved: consequently, and unless some provision were made to prevent it, the rear pre-brake warning light or lights would momentarily flash on during each gear change. Thus, if to avoid the possibility of confusing other drivers, it is desired to prevent such flashing when changing gear, some provision must be made to neutralize closure of the brake safe switch by an automatic and simultaneous opening of the pre-brake warning circuit each time the vehicle clutch pedal is depressed. Advantageously for this purpose, there may optionally be incorporated into the circuit a second brake safe switch S1 (see FIGURE 5), which is arranged in relation to and operated by the clutch pedal lever 23 in much the same way as that in which the first switch is related to and operated by the accelerator pedal lever 22 in the FIGURE 3 arrangement but with this important exception: that whereas, with the vehicle travelling along normally, the first switch S (FIGURE 5) is in the "OFF" or open position and is closed only at such times as the accelerator pedal is released, the second switch S1 is in the "ON" or closed position and is temporarily opened only at such times as the clutch pedal is depressed. Thus, whenever the vehicle is being driven along with the driver's right foot on the accelerator pedal and his left foot idle and in repose, the first switch S will be open and the second switch S1 closed as shown in full lines in FIGURE 5 with the result that the rear warning lights 18 will be "OFF." If now the driver decelerates rapidly by taking his right foot off the accelerator pedal and applying it to the brake pedal (his left foot still being idle), the rear warning lights 18 will light up during the period of transference of the right foot from one pedal to the other and before the brake pedal is depressed all as hereinbefore described; this will be permitted to happen because, there being no depression of the clutch pedal during braking, the switch S1 will remain "ON," i.e. closed. But during a gear change, when the brake pedal is not touched, and the accelerator and clutch pedals are balanced one against the other, the switch S will first be closed simultaneously with opening of the switch S1 and then the last mentioned switch will be closed simultaneously with opening of the switch S, the overall result being that the rear warning lights remain wholly extinguished throughout the gear changing operation and do not flash on.

The or each brake safe switch incorporated into a pre-brake warning circuit need not necessarily be of the form hereinbefore described with reference to FIGURE 1.

For instance, one or more pins carried by the tubular housing may be arranged for co-operation with either a plate or like element or a socket or sockets associated with the spring-loaded plunger, or vice versa. Alternatively, a metal cap which is secured over one end of the tubular housing and is combined with one terminal may be adapted to cooperate with a flange on the plunger, which flange is connected to or with another terminal.

The invention includes within its scope not only a complete electrical pre-brake warning system installed in a road vehicle as hereinbefore described, but also, for use in such a vehicle, a slow-running adjusting screw assembly including a spring-loaded plunger and incorporating a switch, the said assembly being intended to replace a conventional throttle-adjusting screw.

The pre-brake warning system may be fitted to a motorcycle, motor scooter or like vehicle instead of to a motor car, van, lorry or the like as described above. In this event, the system is arranged to operate in the same way in conjunction with the hand-operated accelerator member, i.e. twist grip or hand lever (instead of the accelerator pedal), the hand-operated clutch lever (instead of the clutch pedal), and the brake pedal.

I claim:

1. In a road vehicle powered by an internal combustion engine and having an accelerator member, a pre-brake warning light circuit which is connectable with a source of electric current and includes, in combination, at least one warning lamp, a spring influenced electrical switch device for closing and opening said circuit and thus respectively lighting up and extinguishing said lamp, and mechanical means between the accelerator member and said switch device so arranged that when the driver releases the accelerator member to decelerate the vehicle the switch device is automatically operated to close the circuit and light up the warning lamp, said electrical switch device comprising a two-part tubular housing consisting, on the one hand, of a hollow main body part and, on the other hand, of a hollow plug which is engageable within and closes the said main body part and is provided with an outwardly extending tubular shank, two electrical switch contacts located in said hollow main body part and connected to conductors extending from the housing, a plunger axially movable within and extending beyond the opposite ends of the tubular shank of the plug, a contact element secured upon the inner end of the plunger, and a spring acting on the said plunger and serving normally to hold the contact element clear of the aforementioned two electrical switch contacts, the outer end of the plunger being formed with a head adapted to be acted upon to depress the plunger against the spring action and so cause the contact element to engage and bridge the two electrical contacts, this switch device being of such form that it can be used as a slow-running adjusting screw assembly in place of a conventional throttle-adjusting screw.

2. In a road vehicle powered by an internal combustion engine and having an accelerator member, a pre-brake warning light circuit which is connectable with a source of electrical current and includes, in combination, at least one warning lamp and a switch device comprising a two-part tubular housing consisting, on the one hand, of a hollow main body part and, on the other hand, of a hollow plug which is engageable within and closes the said main body part and is provided with an outwardly extending tubular shank, two electrical switch contacts located in said hollow main body part and connected by conductors extending from the housing to said circuit for closing and opening the latter and thus respectively lighting up and extinguishing the lamp, a plunger axially movable within and extending beyond the opposite ends of the tubular shank of the plug, a contact element secured upon the inner end of the plunger, and a spring acting on the said plunger and serving normally to hold the contact element clear of the aforementioned two electrical switch contacts, the outer end of the plunger being formed with a head adapted to be acted upon by a mechanical part movable with the accelerator member to depress the plunger against the spring action and so cause the contact element to engage and bridge the two electrical contacts, so that when the driver releases the accelerator member to decelerate the vehicle the plunger is moved to automatically close the switch contacts and thereby light up the warning lamp, the switch device being of such form that it can be used as a slow-running adjusting screw assembly in place of a conventional throttle-adjusting screw.

3. In a road vehicle powered by an internal combustion engine and having an accelerator member and a clutch member, a pre-brake warning light circuit which is connectable with a source of electric current and includes, in combination, at least one warning lamp, a spring influenced switch device for closing and opening said circuit and thus respectively lighting up and extinguishing said lamp, mechanical means between the accelerator member and said switch device so arranged that when the driver releases the accelerator member to decelerate the vehicle the switch device is automatically operated to close the circuit and light up the warning lamp, and means for neutralizing closure of the switch device by an automatic and simultaneous opening of the warning light circuit each time the vehicle clutch member is operated during a gear change.

4. A pre-brake warning system according to claim 3, wherein the switch device comprises a tubular housing having movably therein a plunger the inner end of which is arranged to operate switch contacts connected in the said circuit and the outer end of which is engaged with a mechanical part movable with the accelerator member, so that when the driver releases the accelerator member to decelerate the vehicle the plunger is moved to automatically close the switch contacts and thereby light up the warning lamp.

5. A pre-brake warning system according to claim 3, wherein a second switch device is incorporated into the warning light circuit, said second switch being normally held closed and adapted to open only when the clutch member is operated during a gear change.

6. A pre-brake warning light circuit according to claim 5, wherein the said second switch device comprises a tubular housing accommodating a pair of electrical switch contacts and a spring-loaded plunger which is movably mounted in said housing and provided at its inner end with a contact element for bridging the aforesaid pair of switch contacts, the outer end of the said plunger being in contact with a mechanical part movable with the clutch member so that when the driver operates the said member during a gear change the plunger is moved to open the switch.

7. In a road vehicle powered by an internal combustion engine and having accelerator, clutch and brake pedals, a pre-brake warning light circuit which is connectable with a source of electric current and includes, in combination, at least one warning lamp, a first spring-influenced switch device for closing and opening said circuit and thus respectively lighting up and extinguishing said lamp, mechanical means between the accelerator pedal and said first switch device so arranged that when the accelerator pedal is released to decelerate the vehicle the switch device is automatically operated to close the circuit and light up the warning lamp, and a second spring-influenced switch device automatically and simultaneously opening the warning light circuit each time the vehicle clutch pedal is depressed during a gear change.

8. A pre-brake warning circuit according to claim 7, wherein each of the first and the second spring-influenced switch devices comprises a tubular housing accommodating a pair of electrical switch contacts and a spring-loaded plunger which is movably mounted in said housing and is provided at its inner end with a contact element for bridging the aforesaid pair of switch contacts, the outer end of the plunger of the first switch device being pressed in against the spring action by a mechanical part to close the warning circuit whenever the accelerator pedal is released, and the second switch device being mounted on a fixed part with the outer end of its spring-loaded plunger normally contacted and held by the clutch pedal lever in a position to maintain the second switch closed whereby each time the clutch pedal is depressed the last mentioned plunger will be released to permit opening of the second switch and hence also of the warning light circuit.

References Cited

UNITED STATES PATENTS

| 2,552,665 | 5/1951 | Cirone | 340—262 XR |
| 2,568,610 | 9/1951 | Chappell | 340—262 XR |
| 3,103,561 | 9/1963 | Chesler | 340—66 XR |

JOHN W. CALDWELL, *Primary Examiner.*

ALVIN H. WARING, *Assistant Examiner.*